Figure 1:
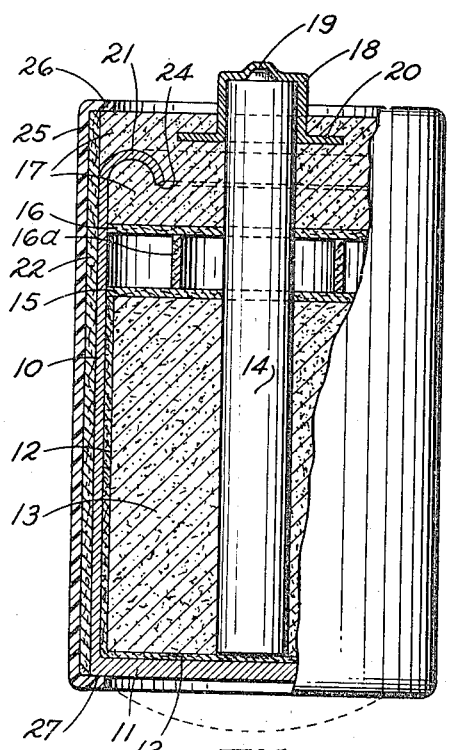

July 6, 1948.  A. F. ROCK  2,444,616

DRY CELL WITH SEALING MEANS

Filed June 27, 1946   2 Sheets-Sheet 1

INVENTOR.
ARTHUR F. ROCK

BY Bosworth + Sessions
ATTORNEYS

July 6, 1948.  A. F. ROCK  2,444,616
DRY CELL WITH SEALING MEANS
Filed June 27, 1946  2 Sheets-Sheet 2

INVENTOR.
ARTHUR F. ROCK
BY
ATTORNEYS

Patented July 6, 1948

2,444,616

UNITED STATES PATENT OFFICE 2,444,616

DRY CELL WITH SEALING MEANS

Arthur F. Rock, Lakewood, Ohio, assignor to General Dry Batteries, Inc., Lakewood, Ohio, a corporation of Ohio Application June 27, 1946, Serial No. 679,810

8 Claims. (Cl. 136—133)

This invention relates to dry cells, and more particularly to dry cells of the type used in flashlights.

It is well known that after ordinary dry cells of the Le Clanche type have become substantially exhausted in service they are subject to difficulties due to leakage of electrolyte and swelling. With ordinary dry cells, leakage of the electrolyte may corrode or otherwise damage the casing of the flashlight or other device in which the cells are used, and the cells, or the cardboard tubes in which they are enclosed, may swell to such an extent as to make it impossible to remove them from the casing.

It is extremely difficult, if not impossible, entirely to prevent leakage of electrolyte from dry cells under some conditions. It is also very difficult to prevent swelling of cells due to the chemical changes which take place within the cells. These difficulties arise because of the fact that if a cell is completely sealed up, very substantial pressures may be developed within it as a result of the chemical action, pressures as high as 150 pounds per square inch having been measured. According to the present invention, the damage resulting from leakage and swelling of dry cells, and particularly flashlight cells, is prevented, not by attempting to construct a completely leakproof and expansion-proof cell, but by minimizing the possibility of leakage from the cell, by retaining any electrolyte which may exude from the cell where it can do no harm to the flashlight case, and by permitting expansion or swelling of the cell to take place in directions where it will not be damaging, while substantially preventing expansion in other directions. Briefly, this is accomplished according to preferred forms of my invention by providing the cell with a wax seal arranged to minimize leakage of electrolyte from the cell and by encasing the cylindrical surfaces of the cell with an absorbent material surrounded by an electrolyte-proof plastic insulating jacket arranged to retain any electrolyte which may leak to the outside of the zinc container.

The cell comprises a zinc container or can which constitutes one electrode of the cell, the circumferential walls of the cell being sufficiently strong to resist the internal pressures developed in the cell without substantial expansion. The bottom wall of the cup or container is heavy enough so that it will not be perforated by the action of the electrolyte under any conditions likely to be encountered in use of the cell, but is light enough so that it can be bulged outwardly by pressures within the cell, thus somewhat relieving such pressures before the wax seal at the other end of the can or container is damaged. By preventing expansion of the cell in radial directions, the possibility of having the cell become stuck in an ordinary flashlight casing is eliminated. The slight bulging of the bottoms of the cells has no damaging effect on the flashlight casing for the reason that the spring contacts customarily provided for engaging the bottom of the cells permit the cells to expand in longitudinal directions without difficulty. The bulging of the bottoms of the cells provides additional space within the cells, thus relieving the internal pressure somewhat.

Figure 2:
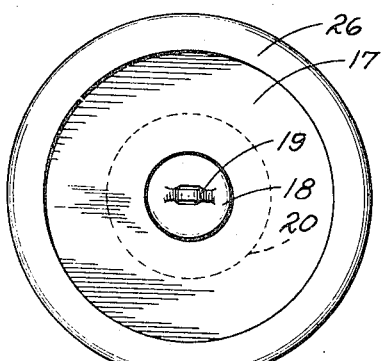

Referring now to the drawings, Figure 1 is a sectional elevational view of a flashlight cell embodying my invention, parts being broken away to show the internal construction of the cell; Figure 2 is a top plan view of the cell of Figure 1; and Figures 3 and 4, Figures 5 and 6, and Figures 7 and 8 are, respectively, sectional elevational and top plan views of three other forms of flashlight cells embodying my invention. In Figures 1, 3, 5 and 7 the wall thicknesses of the zinc can, the plastic jacket and the absorbent material are exaggerated and are not necessarily in correct relative proportion.

Figures 1 and 2 of the drawings illustrate the present invention in perhaps its simplest form. Here the cell comprises a container 10 consisting of a drawn zinc cup circular in cross section and having a bottom wall 11 of somewhat greater thickness than the cylindrical wall thereof. The zinc container is lined with the usual paper separator 12 within which is disposed a mass of depolarizing mix 13 having a carbon electrode 14 embedded therein and projecting above the top of the cell. Washers 15 and 16, composed of chip board, fiber or the like, separated by a ring 16a of similar material, define an air space within the container 10, and the upper end of the container is sealed as indicated at 17 by a sealing compound such as sealing wax composed, for example, of various waxes, rosin and asphaltic materials. The upper end of the carbon electrode is enclosed within a metal cap 18 having a vent 19 therein and a flange 20 which is embedded in the sealing material 17 and thus not only prevents the cap being displaced from the carbon and the carbon from being lifted out of the cell by internal pressure, but also reinforces the sealing material. The carbon electrode 14 is of controlled porosity as is conventional in cells of this character. The carbon is arranged to permit gases generated within the cell to escape through it and through the opening provided by the vent 19, but the porosity of the carbon is preferably controlled so that no substantial leakage of electrolyte through the carbon can take place.

The upper edge of the zinc container 10 is curled inwardly as shown at 21 in the manner described and claimed in the prior patent of Cyril P. Deibel, No. 1,866,016, issued July 5, 1932, the sealing material extending both above and below the turned-in end portion 21 thus providing a very effective seal. The sealing material is poured into position while in a hot molten condition and is molded into cylindrical shape above the curled end 21 of the zinc can by the upper end portion of the tubular jacket 22 which surrounds the zinc can 10 and which is preferably composed of an absorbent material such as chip board, pulp board or the like. The characteristics of the wax used in making the seal 17 are such that it will bond effectively with the metal parts as well as the paper jacket and the carbon electrode 14.

With this construction, so long as the walls of the zinc container are intact, the only path for leakage to take place is from the air space between washers 15 and 16 along the inner surface of the zinc between the wax seal and the curled-in portion 21, around the edge 24 of the curled-in portion and along the outer surface of the curled-in portion to the jacket 22. Because of the nature of the seal, leakage along this long path is unlikely. However, electrolyte under some circumstances may find its way between the sealing material and the metal can to the absorbent jacket 22. Also, the zinc of the container is consumed during the use of the cell and by chemical action which takes place after the cell is exhausted, and occasionally pin holes may form in the cylindrical wall of the container which will permit electrolyte to leak out of the container into the absorbent jacket 22.

In order to prevent any damage from occurring by reason of electrolyte reaching the jacket 22, the jacket is enclosed within an electrolyte-proof plastic tube 25 which is turned or spun inwardly at its upper end as at 26 into engagement with the seal 17, and is turned or spun inwardly at its lower end as at 27 into engagement with the base 11 of the container 10. With this construction, any small amount of electrolyte leaking from the cell along the paths described above will be retained by capillary action in the aborbent jacket 22, and prevented from travelling farther by the plastic tube 25. Experiments have demonstrated that the absorbent jacket 22 does not swell substantially when wet with electrolyte so long as it is protected from the atmosphere by the plastic tube 25. Thus leakage of the electrolyte as described above cannot result in the cell or its insulating cover swelling and sticking within a flashlight casing, and as the electrolyte cannot penetrate the tube 25, it cannot damage the flashlight casing.

The tube 25 is preferably composed of a cellulose acetate butyrate composition, which is an insulator and is impervious to the electrolyte. Obviously other plastic materials may be employed so long as they are impervious to the electrolyte and can be conveniently handled and economically manufactured. Cellulose acetate butyrate is particularly suitable because it can be manufactured at reasonable cost, and because it is thermoplastic and softens at a relatively low temperature so that the heat generated by the friction of the tool used in spinning over the ends of the tube is enough to make the material sufficiently plastic to permit the flanges 26 and 27 to be formed without damaging the material. Also, cellulose acetate butyrate plastics can be obtained in various colors and can be decorated and printed upon at reasonable cost. It is to be noted that the plastic material does not require any particular strength as its function is merely to cover the absorbent tube which may become saturated with electrolyte. The plastic tube does not function to reinforce the zinc container or to retain the end closures of the zinc container to any substantial extent.

In a cell of an ordinary size, such as the usual size D flashlight cell, the pressure developed within the cell is not sufficient substantially to expand the zinc containers in radial directions. The circular cross-section of the container enables it to resist expansion forces in radial directions very effectively; the bottom of the container, however, being substantially flat is not as well able to resist internal pressure without deflection, and for this reason the bottom can be made somewhat heavier than the side wall so that it will not become perforated in service, yet when excessive pressures are developed within the cell, the bottom may be bowed or bulged outwardly approximately to the shape shown in dotted lines in Figure 1, thus providing additional space within the container and somewhat relieving the internal pressure. The wax seal, however, is strong enough to withstand pressures which will bulge the bottom of the cell. Bulging of the bottom of the cell will not cause it to stick in a flashlight case as the ends of the cells ordinarily are engaged by spring contactors and there is ample room within the case to permit axial expansion.

As a specific example of a cell made according to my invention, very satisfactory results were obtained under severe tests with a D size flashlight cell constructed as shown in Figures 1 and 2 and embodying a one-piece drawn zinc cup having an outside diameter of about 1¼ inches, a side wall thickness of from about 0.014 to 0.015 inch and a bottom thickness of from about 0.022 to 0.025 inch, a wax seal having a thickness of approximately ⅜ inch, an absorbent tube composed of chip board having a thickness of approximately 0.020 inch, and an outer plastic tube composed of cellulose acetate butyrate having a thickness of from about 0.010 to 0.012 inch.

As noted above, Figures 1 and 2 show perhaps the simplest type of cell embodying my invention. Other modifications of the invention are shown in the remaining figures of the drawings. In each of these modifications, the inner construction of the cell, the zinc can, the absorbent paper jacket and the plastic tube are essentially the same as those described with reference to Figures 1 and 2. The same reference characters have been applied to these and associated parts in the remaining figures as were used in Figures 1 and 2. The differences in the structure are found entirely in the construction of the seals and metal covers at the upper ends of the cells, and the description of the modified forms will be limited to the points of difference.

Figure 3:
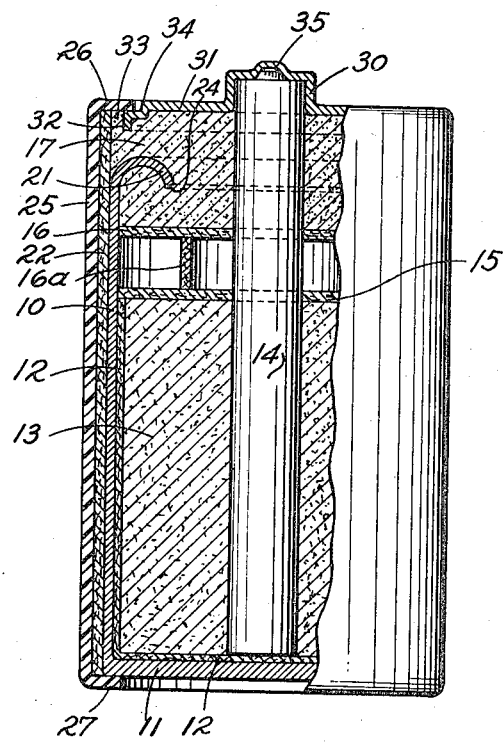
Figure 4:
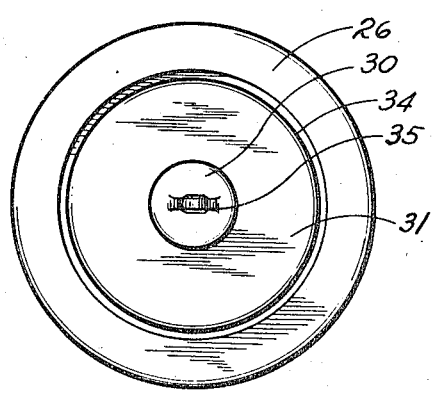

Figures 3 and 4 illustrate a cell in which the metal cap 30 enclosing the top of the carbon electrode 14 is provided with a horizontally extending flange 31 terminating in a downwardly extending edge portion 32 which is embedded in the wax seal 17 to lock the cap and the carbon in place. In this form of the invention, the wax seal is covered by the metal cap 30 except for a thin annular band indicated at 33, and this portion of the seal is covered by the flange 26 of the plastic tube 25, the edge of which is disposed adjacent the shoulder 34 in the cap. The operation of this cell is substantially identical with the cell previously described, a vent 35 being provided in the cap and the absorbent chip board tube 22 and the plastic tube 25 being arranged just as they were in the previously described modification.

Figure 5:
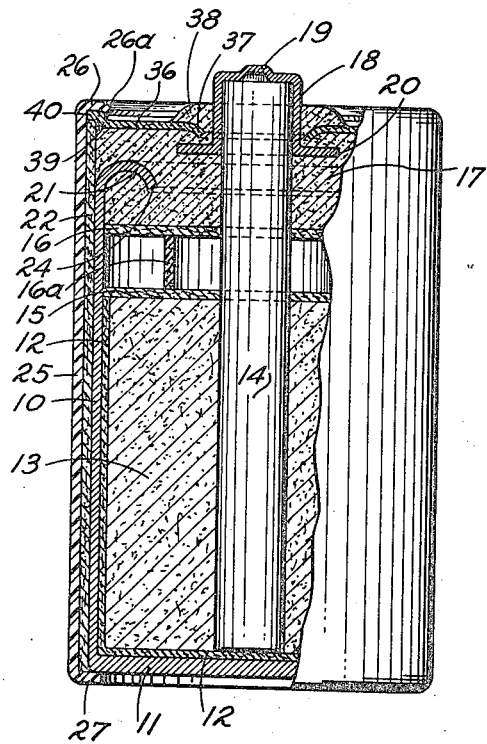
Figure 6:
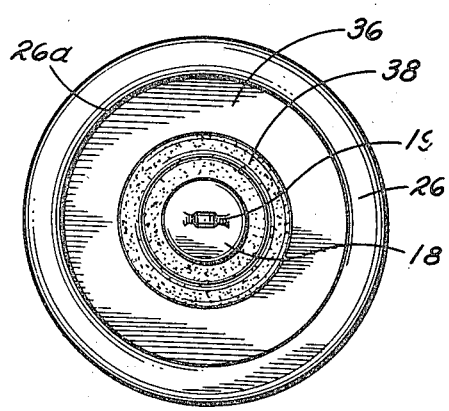

Figures 5 and 6 illustrate a cell in which all of the parts, including the cap 18, are identical with those described with reference to Figures 1 and 2, except that an additional metal plate 36 overlies the outer portion of the wax seal, the plate having a downwardly turned portion 37 adjacent the opening therein, which is embedded in the wax seal 17 and is preferably spaced from the cylindrical portion of the cap 18. A central annular portion of the wax seal shown at 38 is exposed in this form of the invention.

The outer edge of the metal disc or plate 36 is provided with a shoulder as at 39 dimensioned to fit within the absorbent chip board tube 22, and the extreme edge portion 40 of the disc overlies the end of the tube 22 and is disposed beneath the inwardly turned flange 26 of the plastic tube 25, the flange 26 preferably extending inwardly slightly beyond the shoulder 39 and being turned downwardly as at 26a. This provides a very neat appearing construction, the top of the seal being arranged substantially as shown in Figure 3 of the Deibel Patent No. 2,079,495, issued May 4, 1937.

Figure 7:
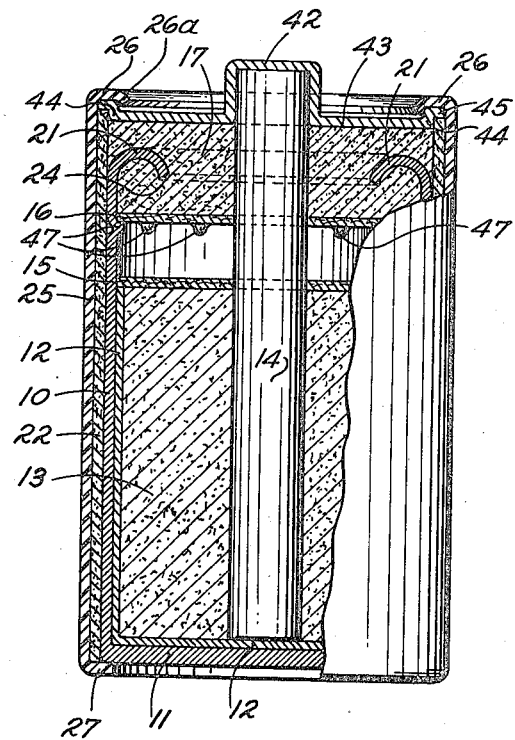
Figure 8:
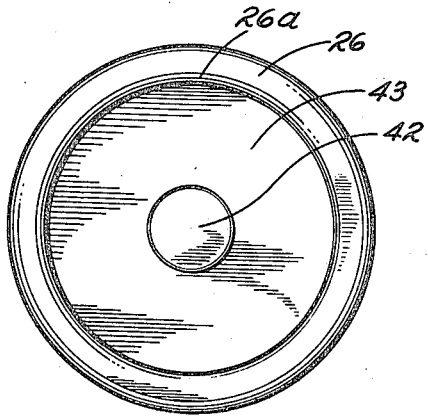

Figures 7 and 8 of the drawings illustrate a type of cell in which the entire upper surface of the wax seal is covered over by a metal cap 42 on the top of the carbon electrode. The cap 42 has a horizontally extending flange 43 which overlies the top of the wax seal 17. Near the outer edge of the flange 43 a shoulder 44, similar to the shoulder 39 previously described, is provided so that the edge portion 45 of the cap overlies the upper end of the absorbent tube 22 and is disposed beneath the inwardly turned flange 26 of the plastic tube 25. Here again the inner edge of the flange is preferably turned downwardly as at 26a. It is to be noted that while the cap 42 constitutes one terminal for the cell, the edge portions of the cap are insulated by the plastic tube 25 and the flange 26 thereof. In this modification no vent is provided in the cap member. Gas escaping through the porous carbon electrode can find its way between the cap and the seal 17 to the absorbent tube 22 and can diffuse through that tube and be discharged from the cell inasmuch as the plastic tube is not hermetically sealed to either end closure of the cell. On the other hand, if the carbon should permit electrolyte to flow through it, the electrolyte would be absorbed by the paper tube 22 and retained within the plastic tube 25.

In this figure also, the zinc can 10 has been modified slightly. In order to support the washer 16, a series of small indentations 47 are made in the can. The presence of these indentations accurately locates the washer 16 and retains it in proper position while the wax seal is being poured. Obviously, this construction can be employed with the cells previously described.

In manufacturing cells made according to all of the modifications disclosed herein, the paper separator 12, mix and carbon are assembled in the usual manner with the zinc electrode; after these operations have been carried out the upper end of the zinc container is curled inwardly as at 21. Thereafter, the absorbent tube 22 is positioned on the zinc and the sealing material poured in hot to seal the cell. In the modification shown in Figure 1, the cap 18 is assembled with the carbon before the pouring operation takes place. In the modification shown in Figure 3, the sealing material is poured, then the cap 30 is assembled with the carbon and the flange 32 embedded in the sealing material while it is still soft. In cells of the type shown in Figure 5, the cap 18 may be assembled with the carbon before the pouring operation takes place while the disc 36 is pressed into place by means of a die which molds the portion 38 of the wax as described in the aforesaid Deibel Patent No. 2,079,495. In the form of the invention shown in Figure 7, the wax is poured and thereafter the cap 42 is assembled with the carbon, this operation being carried on while the wax is still hot. In every case, the final operation in assembling the cell is to apply the plastic tube 25 and spin down or curl over its edges to retain it securely in position.

From the foregoing description of various forms of my invention, it will be evident that I have provided dry cells in which damage due to the leakage of the electrolyte or swelling of the cells is substantially eliminated. My cells can be manufactured at reasonable cost and present a neat and attractive appearance. The cells can be made in standard sizes without reducing the amount of active material within the cells, thus the capacity of the cells is not impaired. The design of my cells is such that any distortion of the cells due to internal pressure will result in bulging of the bottoms of the cells, and accordingly, this bulging can be used as an indication that the cell is substantially exhausted and should be discarded.

Various changes and modifications in my invention will be apparent to those skilled in the art. It is, therefore, to be understood that my patent is not limited to the preferred form of my invention described herein or in any manner other than by the scope of the appended claims.

I claim:

1. In a dry cell embodying a cylindrical zinc container having an open end, and in which are disposed a mass of mix and a central carbon electrode; an absorbent tubular jacket embracing said container and projecting beyond the open end thereof, an end seal comprising a mass of molded sealing material closing the open end of said container, embracing said carbon electrode and closing the end of said absorbent jacket beyond the end of said container, a metal cap enclosing the end of said carbon electrode and having a flange embedded in said sealing material, a separately formed annular metal disc surrounding said carbon electrode and having its outer edge in engagement with said absorbent jacket and its inner edge embedded in said sealing material, and a separately formed tubular member composed of insulating material impervious to the electrolyte of the cell surrounding said absorbent jacket and having an inwardly extending end flange overlying said seal.

2. In a dry cell embodying an open ended drawn zinc container having a cylindrical wall and a bottom wall formed integrally therewith in which are disposed a mass of mix and a central carbon electrode; an absorbent tubular jacket embracing said zinc container and extending above the open end thereof, an end seal for said cell comprising a mass of molded sealing material closing the open end of said container, embracing said carbon electrode and closing the end of said absorbent jacket beyond the end of said container, the bottom wall of said container being of greater thickness than the side wall thereof, said end seal being more resistant to deflection because of pressure within said cell than said bottom wall whereby said bottom wall will bulge outwardly as a result of internal pressure before said end seal, and a separately formed tubular member composed of insulating material impervious to the electrolyte of the cell surrounding said absorbent jacket and having an inwardly extending end flange engaging said bottom wall of said container and an inwardly extending end flange engaging said end seal.

3. In a dry cell embodying an open ended drawn zinc container having a cylindrical wall and a bottom wall formed integrally therewith in which are disposed a mass of mix and a central carbon electrode; an absorbent tubular jacket embracing said zinc container and extending above the open end thereof, an end seal for said cell comprising a mass of molded sealing material closing the open end of said container, embracing said carbon electrode and closing the end of said absorbent jacket beyond the end of said container, the wall of said container being turned inwardly adjacent the upper end thereof and embedded in said sealing material, a metal cap enclosing the end of said carbon electrode and having a flange reinforcing said mass of sealing material, the bottom wall of said container being of greater thickness than the side wall thereof, said end seal being more resistant to deflection because of pressure within said cell than said bottom wall whereby said bottom wall will bulge outwardly as a result of internal pressure before said end seal, and a separately formed tubular member composed of thermo-plastic insulating material impervious to the electrolyte of the cell surrounding said absorbent jacket and having an inwardly extending end flange engaging said bottom wall of said container and an inwardly extending end flange engaging said end seal.

4. In a dry cell embodying a cylindrical zinc container having an open end and in which are disposed a mass of mix and a central carbon electrode; an absorbent tubular jacket embracing said container and projecting beyond the open end thereof, an end seal comprising a mass of molded sealing material closing the open end of said container, embracing said carbon electrode and closing the end of said absorbent jacket beyond the end of said container, the wall of said container being turned inwardly adjacent the upper end thereof and embedded in said sealing material, a metallic cap enclosing the end of said carbon electrode and extending over said mass of sealing material in engagement therewith and into engagement with said absorbent jacket, and a separately formed tubular member composed of insulating material impervious to the electrolyte of the cell surrounding said absorbent jacket and having inwardly extending end flanges, one of which engages the bottom wall of said container, the other of which engages the peripheral portion of said cap.

5. In a dry cell embodying a cylindrical zinc container having an open end and in which are disposed a mass of mix and a central carbon electrode; an absorbent tubular jacket embracing said container and projecting beyond the open end thereof, an end seal comprising a mass of molded sealing material closing the open end of said container, embracing said carbon electrode and closing the end of said absorbent jacket beyond the end of said container, the wall of said container being turned inwardly adjacent the upper end thereof and embedded in said sealing material, an imperforate metallic cap enclosing the end of said carbon electrode and extending over said mass of sealing material in engagement therewith and into engagement with said absorbent jacket, and a separately formed tubular member composed of insulating material impervious to the electrolyte of the cell surrounding said absorbent jacket and having inwardly extending end flanges, one of which engages the bottom wall of said container, the other of which engages the peripheral portion of said cap.

6. In a dry cell embodying a cylindrical zinc container having a bottom wall and an open end, and in which are disposed a mass of mix and a central carbon electrode; an absorbent tubular jacket embracing said container and projecting beyond the open end thereof, a single mass of molded sealing material closing the open end of said container and constituting an end seal embracing said carbon electrode and closing the end of said absorbent jacket beyond the end of said container, and a separately formed tubular member composed of insulating material impervious to the electrolyte of the cell surrounding said absorbent jacket and having inwardly extending top and bottom end flanges overlying the ends of said absorbent jacket and extending over the peripheral margins of the mass of sealing material and the bottom wall of the container, respectively.

7. In a dry cell embodying a cylindrical zinc container having an open end, and in which are disposed a mass of mix and a central carbon electrode; an absorbent tubular jacket embracing said container and projecting beyond the open end thereof, an end seal comprising a mass of molded sealing material closing the open end of said container, embracing said carbon electrode and closing the end of said absorbent jacket beyond the end of said container, a metal cap enclosing the end of said carbon electrode and having an integrally formed flange portion extending outwardly from said carbon electrode in contact with the upper surface of said sealing material and terminating in a downwardly extending edge portion embedded in said sealing material, and a separately formed tubular member composed of insulating material impervious to the electrolyte of the cell surrounding said absorbent jacket and having an inwardly extending end flange overlying said seal.

8. In a dry cell embodying a cylindrical zinc container having an open end and in which are disposed a mass of mix and a central carbon electrode; an absorbent tubular jacket embracing said container and projecting beyond the open end thereof, an end seal comprising a mass of molded sealing material closing the open end of said container, embracing said carbon electrode and closing the end of said absorbent jacket beyond the end of said container, the wall of said container being turned inwardly adjacent the upper end thereof and embedded in said sealing material, a metallic cap enclosing the end of said carbon electrode and extending over said mass of sealing material in engagement therewith and having a peripheral flange embedded in said sealing material, and a separately formed tubular member composed of insulating material impervious to the electrolyte of the cell surrounding said absorbent jacket and having inwardly extending end flanges, one of which engages the bottom wall of said container, the other of which engages the peripheral portion of said cap.

ARTHUR F. ROCK.

REFERENCES CITED

The following references are of record in the file of this patent:

UNITED STATES PATENTS

| Number | Name | Date |
|---|---|---|
| 2,396,693 | Glover | Mar. 19, 1946 |
| 2,410,826 | Lang et al. | Nov. 12, 1946 |

FOREIGN PATENTS

| Number | Country | Date |
|---|---|---|
| 438,663 | Great Britain | Nov. 18, 1935 |